Jan. 31, 1961  B. F. THOMPSON  2,969,830
MULTI-USE ARTICLE OF JUVENILE FURNITURE
Filed Sept. 19, 1958  7 Sheets-Sheet 1
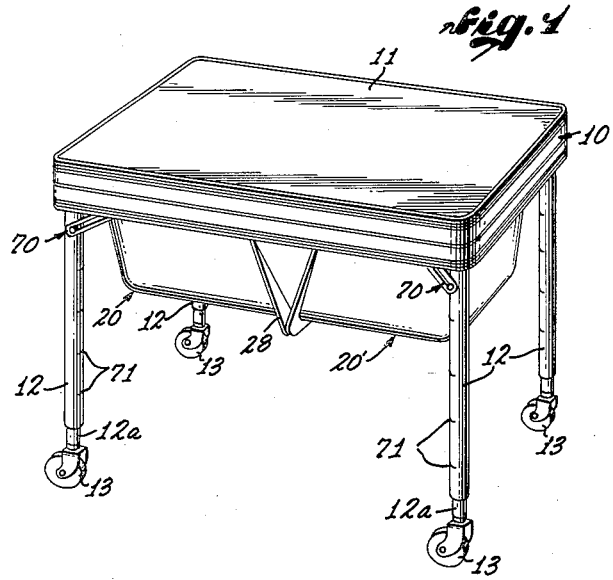
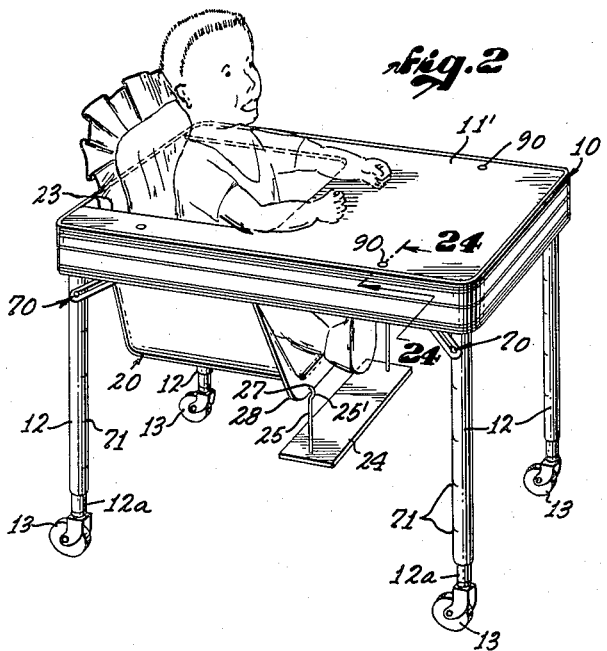
BURNETT F. THOMPSON,
INVENTOR.
HERZIG & JESSUP,
ATTORNEYS.
BY
Albert M. Herzig Jan. 31, 1961 B. F. THOMPSON 2,969,830
MULTI-USE ARTICLE OF JUVENILE FURNITURE
Filed Sept. 19, 1958 7 Sheets-Sheet 2
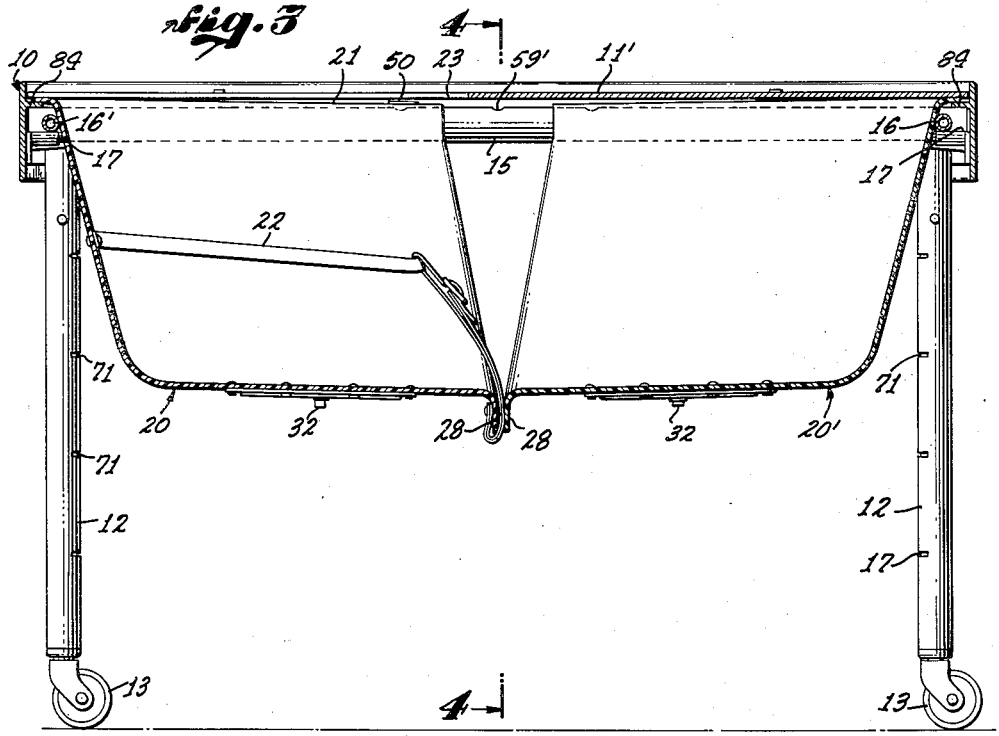
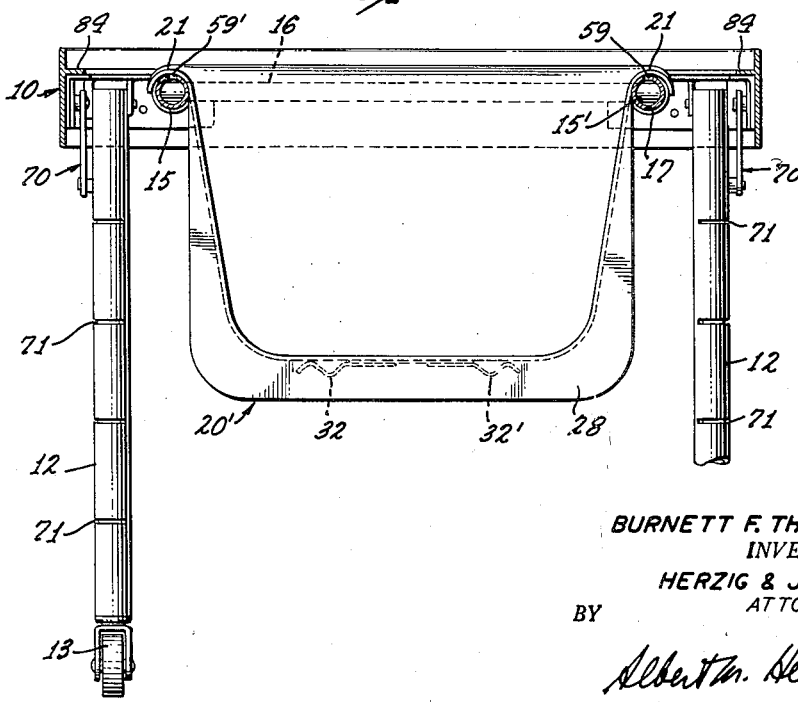
BURNETT F. THOMPSON,
INVENTOR.
BY HERZIG & JESSUP,
ATTORNEYS.

Jan. 31, 1961  B. F. THOMPSON  2,969,830
MULTI-USE ARTICLE OF JUVENILE FURNITURE
Filed Sept. 19, 1958  7 Sheets-Sheet 3

INVENTOR:
BURNETT F. THOMPSON,

HERZIG & JESSUP,
ATTORNEYS.
BY Albert M. Herzig

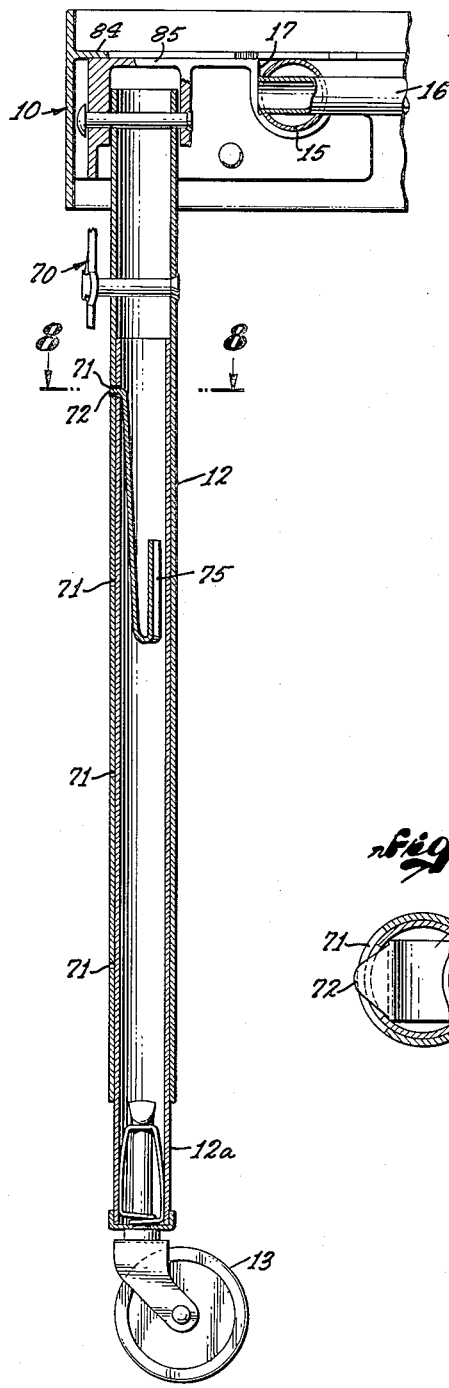
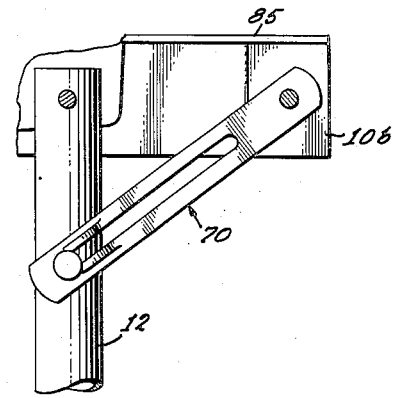
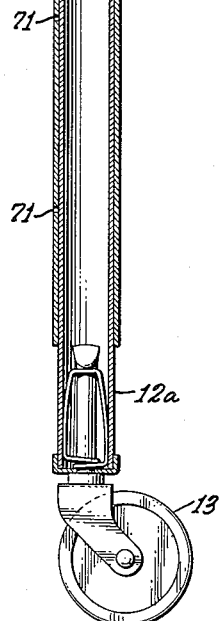
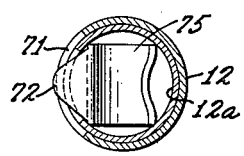
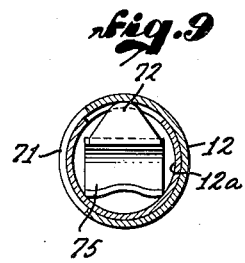
BURNETT F. THOMPSON,
INVENTOR.
HERZIG & JESSUP,
ATTORNEYS.

Jan. 31, 1961 B. F. THOMPSON 2,969,830
MULTI-USE ARTICLE OF JUVENILE FURNITURE
Filed Sept. 19, 1958 7 Sheets-Sheet 5
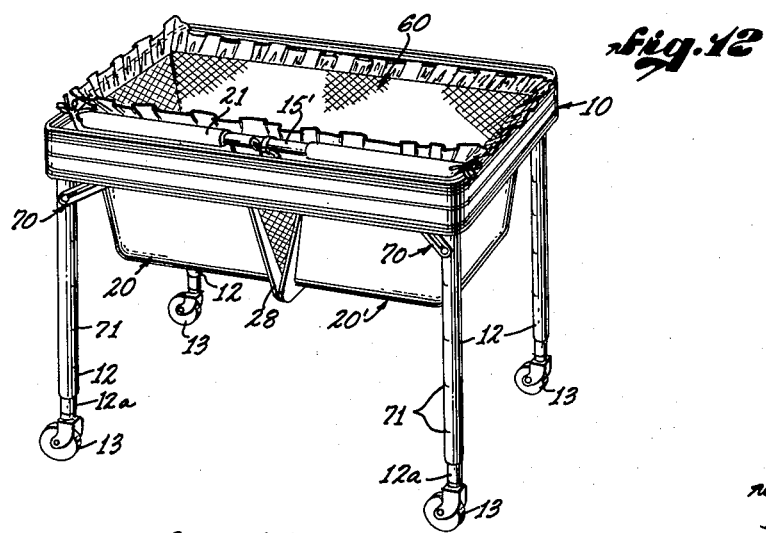
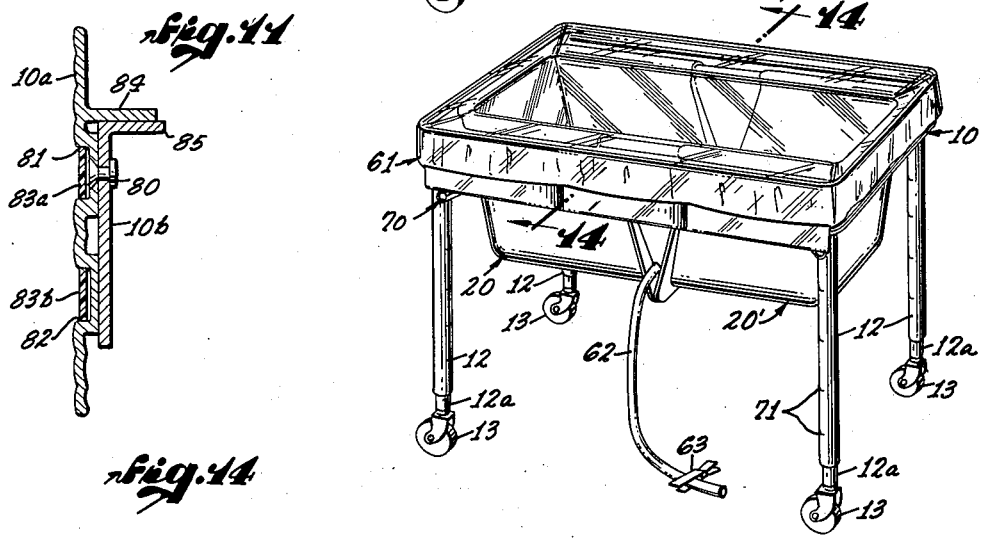
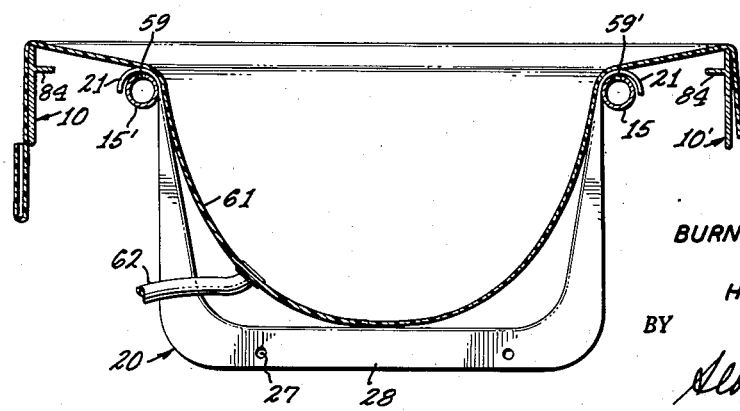
BURNETT F. THOMPSON,
INVENTOR.
HERZIG & JESSUP,
BY ATTORNEYS.

Jan. 31, 1961 B. F. THOMPSON 2,969,830
MULTI-USE ARTICLE OF JUVENILE FURNITURE
Filed Sept. 19, 1958 7 Sheets-Sheet 6
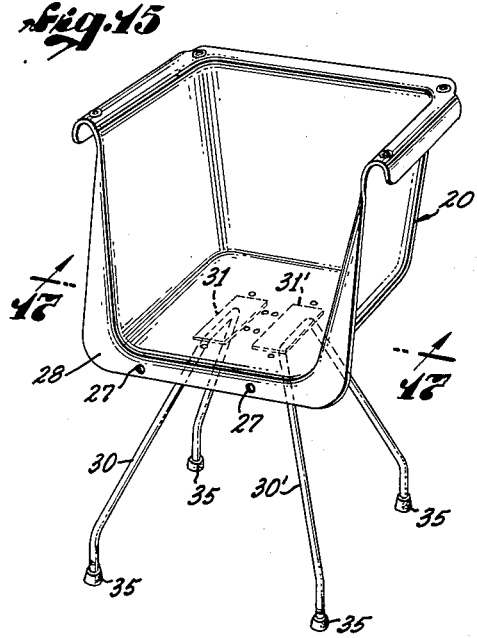
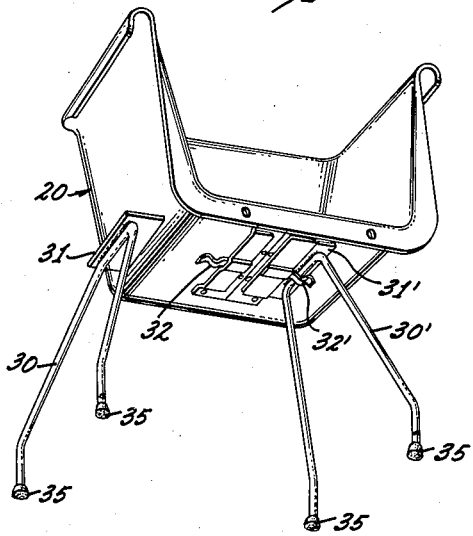
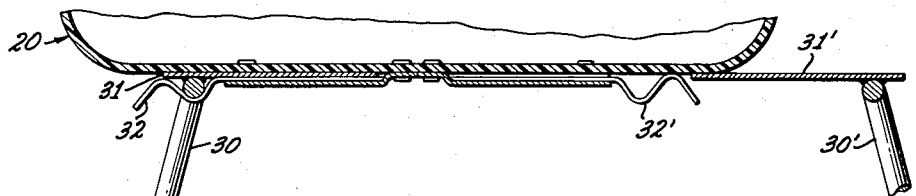
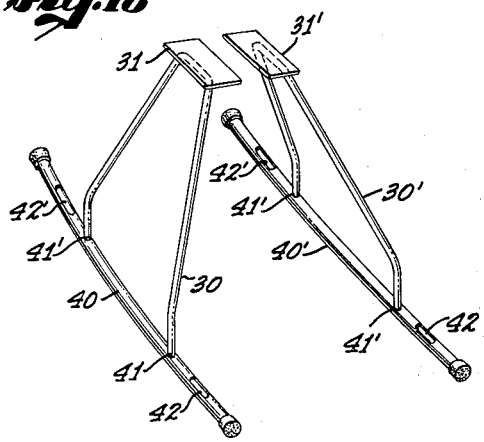
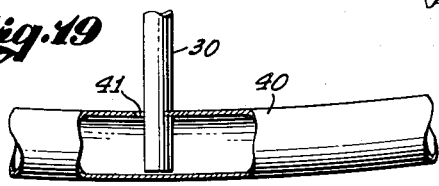
BURNETT F. THOMPSON,
INVENTOR.
HERZIG & JESSUP,
ATTORNEYS.
BY
Albert M. Herzig Jan. 31, 1961 B. F. THOMPSON 2,969,830
MULTI-USE ARTICLE OF JUVENILE FURNITURE
Filed Sept. 19, 1958 7 Sheets-Sheet 7
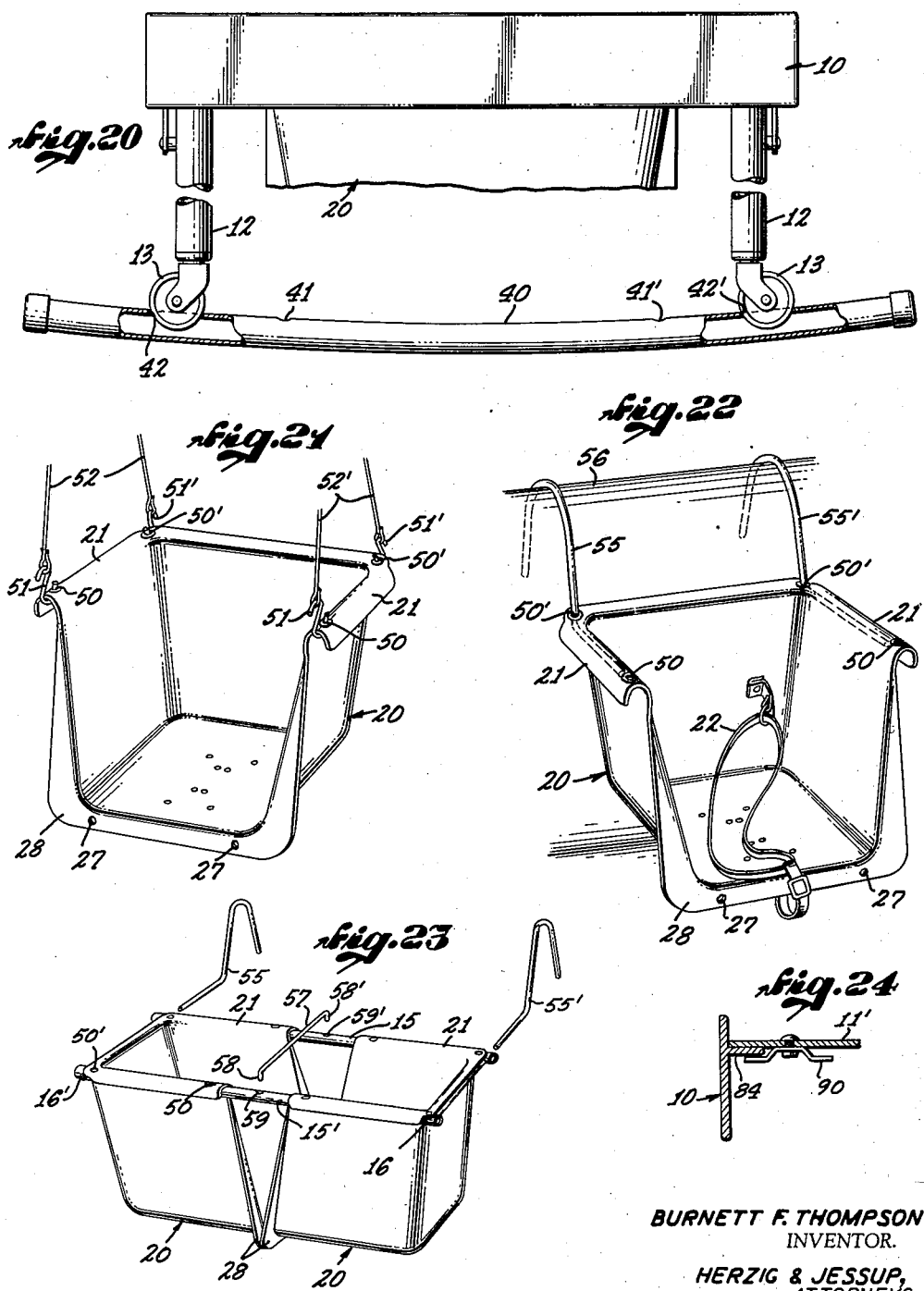
BURNETT F. THOMPSON,
INVENTOR.
HERZIG & JESSUP,
BY ATTORNEYS.

United States Patent Office 2,969,830
Patented Jan. 31, 1961

2,969,830
MULTI-USE ARTICLE OF JUVENILE FURNITURE

Burnett F. Thompson, 1723 Erie Ave., Long Beach, Calif.

Filed Sept. 19, 1958, Ser. No. 762,062

1 Claim. (Cl. 155—44)

This invention relates to a multi-use article of juvenile furniture designed to be utilized in a large number of different ways and even at different ages in the development of a child to eliminate the necessity for the purchase of various articles of juvenile furniture, and is specifically designed for convenient adaptation to a wide variety of desired uses for the child from infancy to approximately ten years of age.

It is usually necessary to provide a relatively large number of different articles of juvenile furniture adapted specifically for use with infants and children, such as high chairs, play tables, cribs, blackboards, car beds and seats, portable beds, swings, rocking cribs or beds, chairs, and rocking chairs, and the like, in order to provide adequately for the care, feeding and entertainment of the child from infancy up to about ten years of age.

In view of the above and other consideration, it is among the objects of this invention to provide an improved multi-use article of juvenile furniture which is relatively simple in construction and mode of operation and which is adapted for mass production.

Another object is to provide such an improved multi-use article of juvenile furniture which is adapted to be converted readily and easily to a plurality of uses.

Still another object of the invention is to provide an improved multi-use article of juvenile furniture having in combination a table frame supported by extensible legs adapted to support the table frame in a plurality of horizontally level positions, a removable bed-seat frame sustained by said table frame, a removable two-part bed-seat structure dependingly supported on the bed-seat frame and means to convert the removable bed-seat frame and bed-seat structure dependingly supported thereon to a car-bed, means to convert the removable bed-seat frame and one part of the removable two-part bed-seat structure while in position in the table frame to a play table, means to convert either one or both parts of the removable two-part bed-seat structure into a chair or into a rocking chair, means to convert the table frame into a rocking table frame, and means to convert the removable bed-seat frame while in position on the table frame into a bathinet.

A further object is to provide a simple, rugged multi-use article of juvenile furniture which is adapted for utility as a bassinet with or without rockers, a bathinet, a car-bed, a play table or high chair and which may be converted to a play table and chair combination for utility as the juvenile reaches young childhood.

Other objects will be apparent as the invention is more fully hereinafter disclosed. This invention is primarily an improvement invention to that invention described and claimed in my prior filed co-pending application bearing Serial No. 399,402, filed December 21, 1953, now Patent No. 2,857,956, entitled Multi-Use Article of Juvenile Furniture, which application is assigned to the same assignee as the present application and is in part a continuation application of the same application.

In accordance with the above objects, I have devised an improved multi-use article of juvenile furniture, one specific embodiment of which is illustrated in the accompanying drawings.

Referring to the drawings:

Fig. 1 is a perspective view of the multi-use article of juvenile furniture of the present invention showing one assembled position of the various parts thereof;

Fig. 2 is a second perspective view of the same showing another assembled position of the various parts thereof;

Fig. 3 is a side elevation view of the assembly shown in Fig. 1 with the removable top part thereof removed;

Fig. 4 is a sectional view taken along plane 4—4 of Fig. 3;

Fig. 7 is an enlarged vertical section of one corner and leg of the assembly of the present invention, illustrating another important feature of the present invention;

Fig. 8 is an enlarged sectional view taken along plane 8—8 of Fig. 7, illustrating one operating position of one of the elements of the present invention;

Fig. 9 is an enlarged sectional view taken along plane 9—9 of Fig. 7, illustrating a second operating position of the same element of the present invention;

Fig. 10 is an enlarged side elevation of another operating element of the present invention in one operating position;

Fig. 11 is an enlarged sectional view taken along plane 11—11 of Fig. 5, illustrating the structure of the table frame;

Fig. 12 is a perspective view illustrating one utility for the assembly of the present invention;

Fig. 13 is a perspective view illustrating another utility for the assembly of the present invention;

Fig. 14 is a sectional view of the assembly shown in Fig. 13 taken along plane 14—14 therein;

Fig. 15 is a perspective view illustrating an important sub-combination of elements comprising the present invention;

Fig. 16 is a second perspective view of the same;

Fig. 17 is an enlarged sectional view of the assembly shown in Figs. 15 and 16, taken along plane 17—17 of Fig. 15;

Fig. 18 is a perspective view illustrating an improvement of the sub-combination of elements shown in Figs. 15 and 16;

Fig. 19 is an enlarged view partly in section further illustrating the improvement shown in Fig. 18;

Fig. 20 is a side elevational view illustrating another improvement of the combination of elements comprising the present invention;

Fig. 21 is a perspective view illustrating another utility of the present invention;

Fig. 22 is a perspective view illustrating still another utility of the present invention;

Fig. 23 is a perspective view illustrating another utility of the present invention; and Fig. 24 is a fragmentary sectional view taken along plane 24—24 of Fig. 2 illustrating another feature of the present invention.

Figure 5:
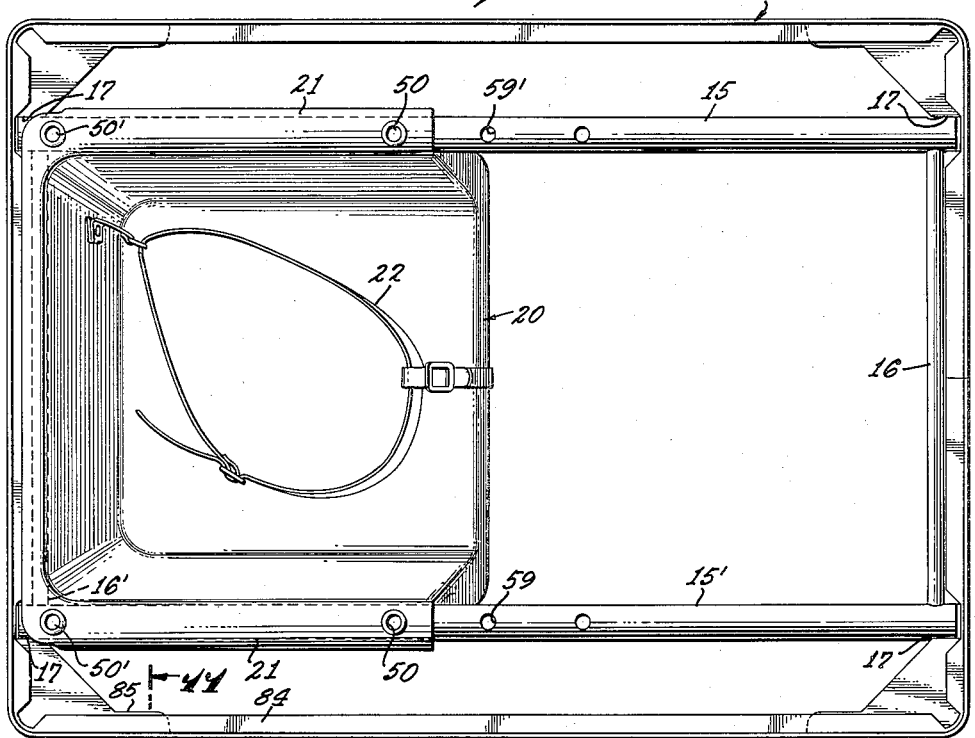
Fig. 5 is a top view of the assembly shown in Fig. 3.

The multi-use article of juvenile furniture illustrated in the drawings as a specific embodiment of the present invention comprises a table structure consisting of a substantially rectangular frame 10, a plurality of removable tops 11, 11', supporting folding legs 12, adjustable as to length, each said leg 12 being provided with casters 13 at the bottom end thereof.

Figure 6:
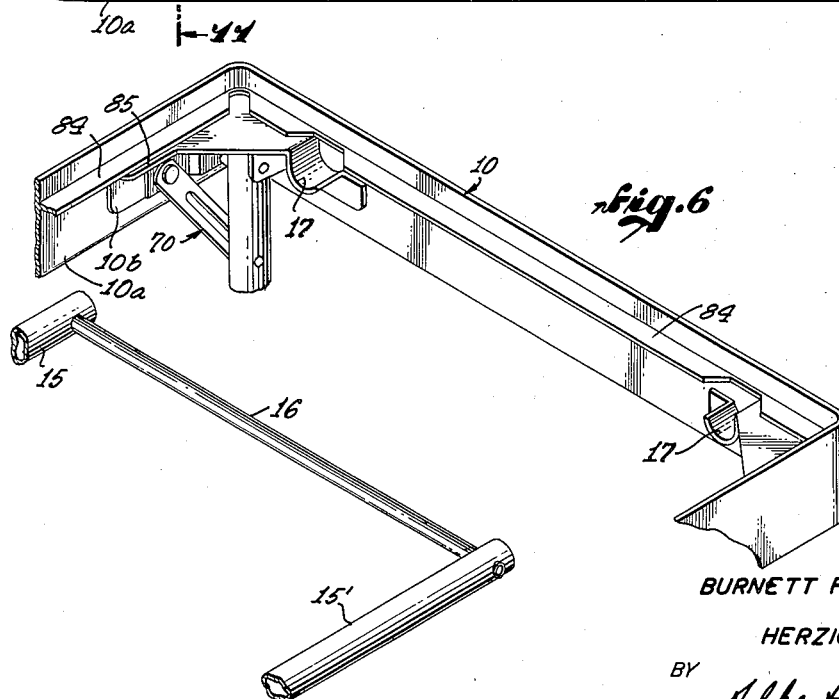
Fig. 6 is an enlarged fragmentary exploded view of one end of the assembly as shown in Fig. 5, illustrating one important feature of the present invention.

The frame 10 (Fig. 5) is provided with a bed-seat stiffener frame 15—16, consisting of parallel side bars 15—15' secured in parallel spaced relation by end bars 16—16'. The bed-seat stiffener frame 15—16 is removably sustained within the frame 10 in sockets 17 (Fig. 6).

Seats 20—20' (Figs. 3, 4 and 5) are provided with arm extrusions 21 curved arcuately to engage the parallel spaced side bars 15—15' to dependingly and removably sustain the seats 20—20' on the bed-seat stiffener frame 15—16. The seats 20—20' are preferably comprised of molded plastic material and in this specific embodiment are of substantially the same size, shape and configuration and interchangeable one for the other. In total size the seats 20—20' substantially enclose the entire area of the seat-bed frame 15—16 to form a recessed bed or bassinet, substantially as indicated in Fig. 3 and in Fig. 1. Either one of the seats 20—20' when used alone form a seat (Fig. 5) and either or both said seats 20—20' are provided with a restraining means such as strap 22 to secure a child in the seat.

One of the table tops 11' is provided with a seat opening 23 in one end thereof, as shown in Fig. 2, adapting the device for utility as a play table. A rotatable lock means 90 (Fig. 24) is provided to secure the table top 11' in position on the frame 10. A foot rest 24 and means 25 to dependingly secure the foot rest 24 from the seat 20 also are provided. The means 25 is designed for ready detachability and in the specific embodiments shown consists essentially of rods 25 having hook ends 25' engaging in openings 27 (Figs. 15–16) in the flange extension 28 of the chair 20.

Referring now to Figs. 15–18 inclusive, each of the seats 20—20' is provided with means adapting each to be converted into a chair or rocking chair. This means consists of a pair of leg structures 30—30' substantially identical in size, shape and configuration to be interchangeable one for the other and means securing the leg structures 30—30' to the under surface of the chair 20—20'. This means consists of a plate and spring clip means, the plates 31—31' being carried by the leg structures 30—30' and the spring clips 32—32' being mounted upon the under surface of the bottom of the seat 20. In the arrangement shown in Figs. 15–17 the leg structures 30—30' are interchangeable in the spring clip securing means 32—32'.

The ends of legs 30—30' are provided with detachable non-skid buttons 35 comprised preferably of a flexible rubber composition and rocker arms 40—40' are provided with spaced openings 41—41' therein adapted to receive and seat therein the ends of legs 30—30' to convert each chair into a rocker chair substantially as indicated in Figs. 18–19.

The rocker arms 40—40' also are provided with rectangular openings 42—42' spaced apart an appropriate distance to receive and seat therein the spaced casters 13 on the ends of legs 12 of the table frame 10 thereby to convert the table frame into a rocker table frame of utility as a cradle when both seats 20—20' are in bed-forming position on the removable frame 15—16, as shown in detail in Fig. 20.

Seats 20—20' also may be converted into swings by means of spaced openings 50—50' in each side arm 21 thereof adjacent the front and rear ends of the arms 21, said openings 50—50' being adapted to receive and secure therein the hook ends 51—51' of swing wires, chains or ropes 52—52', substantially as shown in Fig. 21.

Each seat 20—20' also is adapted by means of hook arms 55—55' to be converted into a car seat as indicated in Fig. 22. In this conversion, the straight section of the hook arm 55 is adapted to pass through the rear openings 50' in each arm 21 to engage the under surface of the arms 21 to dependingly sustain the seat 20 therefrom when the hook ends of the hook arms 55—55' are engaged with the car seat back 56. The means 22 secures the child in seated position in the car seat.

The seat-bed frame 15—16 also is adapted for conversion into a car bed by means of the same hook arms 55—55' as shown in Fig. 23. In this conversion, the straight sections of the hook arms 55—55' are adapted to seat within the hollow interior of tubular cross-bars 16—16' at each end of the frame 15—16 to sustain the bed frame horizontally therebetween when the hook ends of the hook arms 55—55' are positioned over the car seat back 56 on the opposite side of the back 56 from the side indicated in Fig. 22. A brace bar 57 having hook ends 58—58' engaging openings 59—59' in side bars 15—15' of the seat bed frame 15—16 is provided to strengthen the frame for this utility. Bar 57 also functions as a guard against the child being thrown out of the bed and to facilitate this, strap means 22 may be utilized to secure the brace bar 57 in position.

Referring now to Fig. 12, the conversion of the table frame structure with the seats 20—20' in bed-forming position therein on the support frame 15—16 into a bassinet by means of pad 60 illustrated.

In Fig. 13, the conversion of the table frame structure with the seats 20—20' in bed-forming position therein on the support frame 15—16 into a bathinet is shown. This conversion is obtained by means of a heavy rubber sheet 61 molded to the size and shape indicated in the drawings (Figs. 13–14). A rubber drain hose 62 is provided in the bottom of the sheet 61 with a suitable pinch valve means 63 to control the drainage of the bath water from the sheet 61.

Referring now to Figs. 7 to 10, inclusive, the details of the extensible folding supporting legs 12 are shown. Normally, the length of the rectangular table frame 10 is insufficient to provide for folding legs having a length adequate to sustain the table frame 10 at a horizontal level convenient to adults of average heights. To obviate this situation, each of the legs 12 is made extensible from a minimum length adapting the legs to be folded by the folding means 70 (Fig. 10) from the vertical position indicated in Fig. 7 to a horizontal position at a 90° angle thereto within the longer side of the table frame 10 to one of a plurality of selected lengths greater than this minimum length thereby to provide a plurality of horizontal levels to which the table frame 10 may be selectively located at the selective discretion of the user thereof.

Insofar as the folding means 70 is concerned, the means, per se, forms no part of the present invention except as being necessary and essential thereto as one of the operating elements thereof, the means otherwise being a means old and well known as the art.

Insofar as the extensible leg feature of the present invention is concerned, this means is substantially identical to the extensible leg feature described and claimed in my prior filed application, Serial No. 399,402, filed December 21, 1953, with improvements thereof, and in this respect this application is in part a continuation-in-part application of my said prior filed application.

The manner in which the legs 12 of the table structure can be extended to raise the table top 10 selected distances above the surface upon which the article of furniture is disposed, is clearly shown in Fig. 7 of the drawings.

Each of the legs 12 includes an outer tubular section 12 and an inner tubular section 12a telescopically engaged in said outer tubular section 12 and movable therein from a minimum length provided at fully telescoped position adapting the leg 12 with the caster 13 mounted on the end thereof to be folded by the means 70 to a folded position within the table frame 10, to a maximum length or to a plurality of intermediate positions, at the selection of the user, providing for the location of the table top 10 at one of a plurality of selected horizontal levels.

The outer leg section 12 is provided with a plurality of axially aligned spaced openings 71 (see Figs. 8 and 9) along the length of the leg section. The inner leg section 12a telescopically engaging the outer section 12 is provided with a spring-urged detent 72 adjacent its upper end, said detent 72 being provided with a rounded surface face adapted to seat within the openings 71 to restrain relative axial movement of the leg sections 12—12a. Leg section 12a, being rotatably as well as telescopically movable in the leg section 12, may be rotated about its axis to disengage the detent 72 from the opening 71 and to engage the outer face thereof with the inner surface of the outer leg section 12, as shown in Fig. 9. In this position of the detent 72, the inner leg section 12a is free for telescopic movement, inwardly or outwardly in outer leg section 12 and may be moved inwardly to leg folding position or outwardly to a position where on a reverse rotation of the inner leg section 12a, the detent 72 is spring-urged by the spring means 75 into any selected one of the plurality of aligned openings 71. Suitable scale markings are provided on the outer surface of the inner leg section 12a to facilitate the selective movement of the leg section 12 in the leg section 12 to the plurality of detent engaging positions.

Referring now to Fig. 11, the table frame 10 is indicated in greater detail over that indicated in the remaining figures. In this form the table frame 10 is comprised of an extruded section 10a secured to a socket bracket 10b having the socket 17 therein, as by spaced rivets 80 along the length thereof. The outer section 10a is provided with parallel spaced channels 81—82 within which the heads of the rivets 80 are located and decorative strips 83a—83b are mounted in the channels 81—82 in covering position over the heads of the rivets 80. The double flange extensions 84—85 in this structure provide a strong peripheral support for the table top 11 and the riveted-together sections provide a strong table frame 10, advantages which are of importance as the age of the child increases to school age and above.

It is believed apparent from the above disclosure that the multi-use article of furniture of the present invention is adapted for wide utility and for conversion into a plurality of articles of furniture each serving the needs of a child from infancy up to about age 10.

Having hereinabove disclosed the present invention broadly and specifically and having disclosed and illustrated one specific embodiment thereof in the drawings it is believed apparent that the invention may be widely varied without essential departure therefrom and all such modifications, changes and departures therefrom are contemplated as may fall within the scope of the following claim.

I claim:

In a multi-use article of juvenile furniture, the combination including a rectangular table frame provided with foldable and extensible legs, a bed frame and means removably securing the bed frame to the inner periphery of said table frame in table frame strengthening position relative thereto, a pair of bucket seats and means removably and dependingly securing each said bucket seat separately to the bed frame to define thereby a bed recess.

References Cited in the file of this patent

UNITED STATES PATENTS

| | | |
|---|---|---|
| 355,532 | Holman | Jan. 4, 1887 |
| 990,315 | Thomas | Apr. 25, 1911 |
| 1,295,382 | Stelzer | Feb. 25, 1919 |
| 1,461,458 | Robinson | July 10, 1923 |
| 2,243,190 | Capaldo | May 27, 1941 |
| 2,296,241 | Blum | Sept. 22, 1942 |
| 2,537,903 | Markowitz | Jan. 9, 1951 |
| 2,548,648 | Booth | Apr. 10, 1951 |
| 2,613,724 | Arnold | Oct. 14, 1952 |
| 2,617,119 | Linden | Nov. 11, 1952 |
| 2,645,786 | Loftin | July 21, 1953 |
| 2,671,680 | Stevens | Mar. 9, 1954 |
| 2,695,654 | Boyd | Nov. 30, 1954 |
| 2,695,656 | Wagman | Nov. 30, 1954 |
| 2,701,602 | Baker | Feb. 8, 1955 |
| 2,725,094 | Goldblatt et al. | Nov. 29, 1955 |
| 2,764,228 | Donohue | Sept. 25, 1956 |
| 2,857,956 | Thompson | Oct. 28, 1958 |

FOREIGN PATENTS

| | | |
|---|---|---|
| 513,661 | Canada | June 14, 1955 |